United States Patent
Horiba et al.

(10) Patent No.: US 11,383,714 B2
(45) Date of Patent: Jul. 12, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Ayumu Horiba, Wako (JP); Tadahiko Kanoh, Wako (JP); Katsuya Yashiro, Wako (JP); Chihiro Oguro, Wako (JP); Nozomu Hirosawa, Wako (JP); Toru Kokaki, Wako (JP); Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 59 days.

(21) Appl. No.: 16/922,028

(22) Filed: Jul. 7, 2020

(65) Prior Publication Data
US 2021/0009134 A1  Jan. 14, 2021

(30) Foreign Application Priority Data

Jul. 9, 2019 (JP) .............................. JP2019-127896
May 26, 2020 (JP) .............................. JP2020-091697

(51) Int. Cl.
*B60W 40/04* (2006.01)
*B60W 30/18* (2012.01)

(52) U.S. Cl.
CPC ...... *B60W 30/18163* (2013.01); *B60W 40/04* (2013.01); *B60W 2552/05* (2020.02);
(Continued)

(58) Field of Classification Search
CPC .......... B60W 30/18163; B60W 40/04; B60W 2552/05; B60W 2554/4042;
(Continued)

(56) References Cited

U.S. PATENT DOCUMENTS

2017/0018189 A1* 1/2017 Ishikawa .............. G05D 1/0088
2017/0031361 A1* 2/2017 Olson ............... B60W 30/0953

FOREIGN PATENT DOCUMENTS

DE 102018116982 A1 * 12/2019 .......... B60W 30/095
JP 2010-036757 2/2010
(Continued)

OTHER PUBLICATIONS

English Translation_JP2016004443A (Year: 2016).*
(Continued)

*Primary Examiner* — Peter D Nolan
*Assistant Examiner* — Ashley L Redhead, Jr.
(74) *Attorney, Agent, or Firm* — Amin, Turocy & Watson, LLP

(57) ABSTRACT

A vehicle control device includes a driving controller configured to control a speed and steering of a vehicle to perform an automatic lane change, in which the driving controller limits the automatic lane change when it is detected that the vehicle is in a first area having a length of a first distance in a longitudinal direction of a road with a starting point of a specific road structure set as a reference or in a second area having a length of a second distance in the longitudinal direction of the road with an end point of the specific road structure set as a reference on the basis of information of at least one of an external recognition result and map information.

12 Claims, 12 Drawing Sheets

(52) U.S. Cl.
    CPC ............... *B60W 2554/4042* (2020.02); *B60W 2554/4044* (2020.02)

(58) Field of Classification Search
    CPC ......... B60W 2554/4044; B60W 50/14; B60W 60/0015; B60W 2552/00; B60W 2554/804
    See application file for complete search history.

(56) References Cited

FOREIGN PATENT DOCUMENTS

| | | | | |
|---|---|---|---|---|
| JP | 2016-002893 | | 1/2016 | |
| JP | 2016004443 A | * | 1/2016 | ............... B60Q 9/00 |
| JP | 2017-037364 | | 2/2017 | |
| JP | 2019-073042 | | 5/2019 | |
| KR | 20200026573 A | * | 3/2020 | |
| WO | 2018-020547 | | 2/2018 | |
| WO | 2018/138765 | | 8/2018 | |

OTHER PUBLICATIONS

English Translation_KR20200026573A (Year: 2020).*
English Translation_EspaceNet_DE102018116982A1 (Year: 2018).*
Japanese Office Action for Japanese Patent Application No. 2020-091697 dated Nov. 16, 2021.
Japanese Office Action for Japanese Patent Application No. 2020-091697 dated Jan. 18, 2022.

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-127896, filed Jul. 9, 2019, and Japanese Patent application No. 2020-091697, filed May 26, 2020, the content of both of which is incorporated herein by reference.

BACKGROUND

Field of the Invention

The present invention relates to a vehicle control device, a vehicle control method, and a storage medium.

Description of Related Art

Conventionally, a technology of setting a target steering force such that a proportion of a first steering force is higher when traveling of a host vehicle in a tunnel is detected than when the traveling of a host vehicle in a tunnel is not detected is known (Japanese Unexamined Patent Application, First Publication No. 2010-36757).

SUMMARY

Incidentally, automated driving and automatic lane change have been put into practical use in recent years, but it has not been considered how to handle control of a lane change when a vehicle passes through a specific road structure such as a tunnel in a conventional technology.

The present invention has been made in view of such circumstances, and an object thereof is to provide a vehicle control device, a vehicle control method, and a storage medium which can appropriately suppress control in a situation where an automatic lane change of a vehicle is inappropriate.

The vehicle control device, the vehicle control method, and the storage medium according to the present invention have adopted the following configuration.

(1): A vehicle control device according to one aspect of the present invention includes a driving controller configured to control a speed and steering of a vehicle to perform an automatic lane change, in which the driving controller limits the automatic lane change when it is detected that the vehicle is in a first area having a length of a first distance in a longitudinal direction of a road with a starting point of a specific road structure set as a reference or in a second area having a length of a second distance in the longitudinal direction of the road with an end point of the specific road structure set as a reference on the basis of information of at least one of an external recognition result and map information.

(2): In the aspect of (1) described above, the driving controller performs an automatic lane change from a host traveling lane to an adjacent lane when overtaking of a preceding vehicle that travels on the same lane as the vehicle is performed, and then the automatic lane change is performed from the adjacent lane to the host traveling lane.

(3): In the aspect of (2) described above, the driving controller permits the automatic lane change when it is determined that the automatic lane change from the adjacent lane related to the overtaking to the host traveling lane can be completed before the vehicle reaches the second area after the vehicle passes through the first area.

(4): In the aspect of (2) described above, the driving controller permits the automatic lane change before the vehicle reaches the second area after the vehicle passes through the first area, and performs the automatic lane change from the adjacent lane to the host traveling lane after the vehicle passes through the second area instead of performing the automatic lane change from the adjacent lane to the host traveling lane before the vehicle passes through the second area when it is determined that the automatic lane change from the adjacent lane to the host traveling lane cannot be completed due to a situation change after an automatic lane change from the host traveling lane to the adjacent lane is performed.

(5): In the aspect of (2) described above, the driving controller performs the overtaking when it is determined that the automatic lane change from the adjacent lane related to the overtaking to the host traveling lane can be completed before the vehicle reaches the first area.

(6): In the aspect of (5) described above, the driving controller performs the automatic lane change from the host traveling lane to the adjacent lane after the vehicle passes through the first area instead of performing the automatic lane change from the host traveling lane to the adjacent lane before the vehicle passes through the first area when it is determined that the automatic lane change from the adjacent lane related to the overtaking to the host traveling lane cannot be completed before the vehicle reaches the first area.

(7): In the aspect of (5) described above, the driving controller determines whether to perform the overtaking again after the vehicle passes through the first area when it is determined that the automatic lane change from the adjacent lane related to the overtaking to the host traveling lane cannot be completed before the vehicle reaches the first area.

(8): In the aspect of (1) described above, when a distance from an end point of a first specific road structure to a starting point of a second specific road structure through which the vehicle passes next to the first specific road structure is equal to or less than a predetermined distance, the driving controller limits the automatic lane change in a section from the end point of the first specific road structure to the starting point of the second specific road structure.

(9): In the aspect of (1) described above, when it is detected that the vehicle is in the first area or the second area, the driving controller executes a predetermined type of automatic lane change and does not execute an automatic lane change other than the predetermined type.

(10): In the aspect of (1) described above, the road structure includes at least a tunnel or a bridge.

(11): In the aspect of (1) described above, the driving controller changes a length of at least one of the first area and the second area in the longitudinal direction of a road on the basis of specific information indicating a traveling environment in the specific road structure.

(12): In the aspect of (11) described above, the specific information includes information of at least a part of a length of the specific road structure in the longitudinal direction of the road, an illuminance in the specific road structure, and a gradient or curvature of the road.

(13): A vehicle control device according to another aspect of the present invention includes a driving controller configured to control a speed and steering of a vehicle to perform an automatic lane change, in which the driving controller performs control such that the vehicle automatically overtakes a preceding vehicle that travels in the same direction as the vehicle on the same lane, and limits overtaking of the preceding vehicle when it is detected that the vehicle is in a first area having a length of a first distance in a longitudinal direction of a road with a starting point of a specific road structure set as a reference or in a second area having a length of a second distance in the longitudinal direction of the road with an end point of the specific road structure set as a reference on the basis of information of at least one of an external recognition result and map information.

(14): A vehicle control method according to still another aspect of the present invention includes, by a computer, controlling a speed and steering of a vehicle to perform an automatic lane change, and limiting the automatic lane change when it is detected that the vehicle is in a first area having a length of a first distance in a longitudinal direction of a road with a starting point of a specific road structure set as a reference or in a second area having a length of a second distance in the longitudinal direction of the road with an end point of the specific road structure set as a reference on the basis of information of at least one of an external recognition result and map information.

(15): A storage medium according to still another aspect of the present invention is a computer-readable non-transitory storage medium that stores a program causing a computer to execute processing of controlling a speed and steering of a vehicle to perform an automatic lane change, and processing of limiting the automatic lane change when it is detected that the vehicle is in a first area having a length of a first distance in a longitudinal direction of a road with a starting point of a specific road structure set as a reference or in a second area having a length of a second distance in the longitudinal direction of the road with an end point of the specific road structure set as a reference on the basis of information of at least one of an external recognition result and map information.

According to aspects of (1) to (15) described above, it is possible to appropriately suppress control in a situation where the automatic lane change of a vehicle is inappropriate.

DESCRIPTION OF EMBODIMENTS

Hereinafter, embodiments of a vehicle control device, a vehicle control method, and a storage medium of the present invention will be described with reference to the drawings.

First Embodiment

Figure 1:
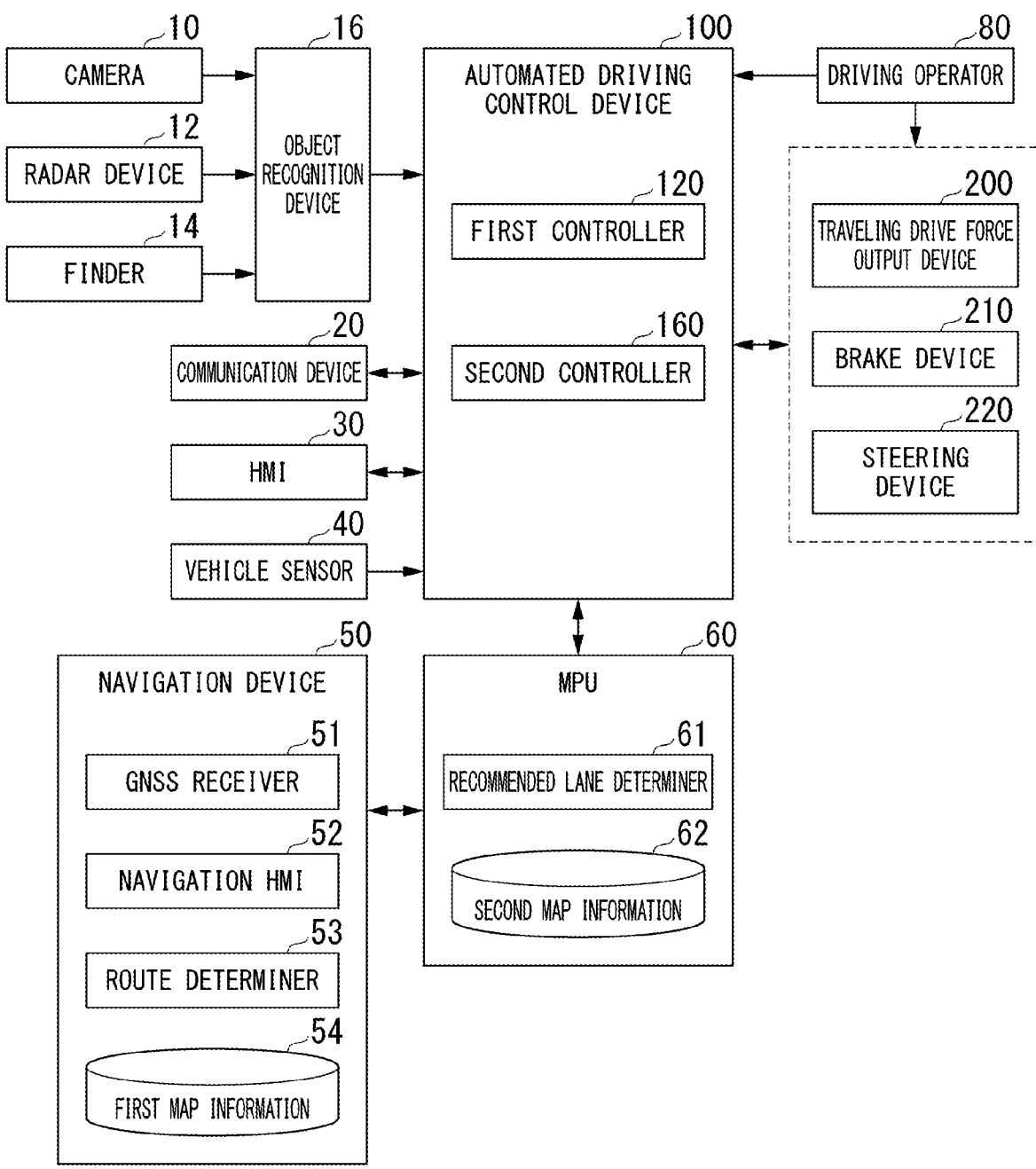
FIG. 1 is a configuration diagram of a vehicle system using a vehicle control device according to a first embodiment.

Hereinafter, a first embodiment will be described.
[Overall Configuration]
FIG. 1 is a configuration diagram of a vehicle system 1 using a vehicle control device according to the first embodiment. A vehicle in which the vehicle system 1 is mounted is, for example, a two-wheeled vehicle, a three-wheeled vehicle, a four-wheeled vehicle, or the like, and a drive source thereof is an internal combustion engine such as a diesel engine or a gasoline engine, an electric motor, or a combination thereof. The electric motor operates using electric power generated by a generator connected to the internal combustion engine or electric power discharged from a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a traveling drive force output device 200, a brake device 210, and a steering device 220. The automated driving control device 100 is an example of a vehicle control device. These devices or apparatuses are connected to each other by a multiplex communication line such as a controller area network (CAN) communicator line, a serial communication line, a wireless communication network, or the like. The configuration shown in FIG. 1 is merely an example, and a part of the configuration may be omitted or another configuration may be added.

The camera 10 is, for example, a digital camera using a solid-state imaging device such as a charge coupled device (CCD) or a complementary metal oxide semiconductor (CMOS). The camera 10 is attached to an arbitrary position of a vehicle M (hereinafter, a host vehicle) in which the vehicle system 1 is mounted. When the front is imaged, the camera 10 is attached to an upper part of the front windshield, a back of the rearview mirror, or the like. The camera 10 periodically repeats to image a vicinity of the host vehicle. The camera 10 may also be a stereo camera.

The radar device 12 emits radio waves such as millimeter waves to the vicinity of the host vehicle and detects the radio waves (reflected waves) reflected by an object to detect at least a position (a distance and an orientation) of the object. The radar device 12 is attached to an arbitrary position of the host vehicle. The radar device 12 may also detect the position and speed of an object according to a frequency modulated continuous wave (FM-CW) method.

The finder 14 is light detection and ranging (LIDAR). The finder 14 irradiates the vicinity of the host vehicle with light and measures scattered light. The finder 14 detects a distance to a target on the basis of time from light emission to light reception. The irradiated light is, for example, pulsed laser light. The finder 14 is attached to an arbitrary position of the host vehicle.

The object recognition device 16 recognizes the position, type, speed, and the like of an object by performing sensor fusion processing on results of detection by some or all of the camera 10, the radar device 12, and the finder 14. The object recognition device 16 outputs a result of the recognition to the automated driving control device 100. The object recognition device 16 may output the results of detection by the camera 10, the radar device 12, and the finder 14 to the automated driving control device 100 as they are. The object recognition device 16 may also be omitted from the vehicle system 1.

The communication device 20 uses, for example, a cellular network, a Wi-Fi network, a Bluetooth (registered trademark), a dedicated short range communication (DSRC), or the like to communicate with other vehicles present in the vicinity of the host vehicle, or various server devices.

The HMI 30 presents various types of information to an occupant of the host vehicle and receives an input operation by the occupant. The HMI 30 includes various display devices, speakers, buzzers, touch panels, switches, keys, and the like.

The vehicle sensor 40 includes a vehicle speed sensor that detects the speed of the host vehicle, an acceleration sensor that detects acceleration thereof, a yaw rate sensor that detects an angular velocity around a vertical axis, an orientation sensor that detects a direction of the host vehicle, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle on the basis of a signal received from a GNSS satellite. The position of the host vehicle may be identified or supplemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route (hereinafter, a route on a map) from the position (or an arbitrary input position) of the host vehicle identified by the GNSS receiver 51 to a destination input from the occupant using the navigation HMI 52 with reference to the first map information 54. The first map information 54 is, for example, information in which a road shape is expressed by a link indicating a road and a node connected by the link. The first map information 54 may include curvature of a road, point of interest (POI) information, and the like. The route on a map is output to the MPU 60. The navigation device 50 may perform route guidance using the navigation HMI 52 on the basis of the route on a map. The navigation device 50 may be realized by, for example, a function of a terminal device such as a smart phone or a tablet terminal owned by the occupant. The navigation device 50 may transmit a current position and a destination to a navigation server via the communication device 20 and acquire a route equivalent to the route on a map from the navigation server.

The MPU 60 includes, for example, a recommended lane determiner 61, and holds second map information 62 in the storage device such as an HDD or a flash memory. The recommended lane determiner 61 divides the route on a map provided from the navigation device 50 into a plurality of blocks (for example, divides every 100 [m] in a vehicle traveling direction), and determines a recommended lane for each block with reference to the second map information 62. The recommended lane determiner 61 determines which numbered lane to travel from the left. When there is a branch point in the route on a map, the recommended lane determiner 61 determines a recommended lane such that the host vehicle travels in a reasonable route for traveling to a branch destination.

The second map information 62 is map information with higher accuracy than the first map information 54. The second map information 62 includes, for example, information on a center of a lane, information on a boundary of the lane, or the like. The second map information 62 may include road information, traffic regulation information, address information (addresses/postal codes), facility information, telephone number information, and the like. The second map information 62 may be updated at any time by the communication device 20 communicating with another device.

The driving operator 80 includes, for example, an accelerator pedal, a brake pedal, a shift lever, a steering wheel, a modified steer, a joystick, a turn signal lever, and other operators. A sensor that detects an operation amount or a presence or absence of an operation is attached to the driving operator 80, and this detection result is output to the automated driving control device 100 or some or all of the traveling drive force output device 200, the brake device 210, and the steering device 220.

The automated driving control device 100 includes, for example, a first controller 120 and a second controller 160. Each of the first controller 120 and the second controller 160 is realized by, for example, a hardware processor such as a central processing unit (CPU) executing a program (software). Some or all of these components may be realized by hardware (a circuit; including circuitry) such as a large scale integration (LSI), an application specific integrated circuit (ASIC), a field-programmable gate array (FPGA), or a graphics processing unit (GPU) and may also be realized by a cooperation of software and hardware. The program may be stored in advance in a storage device (a storage device including a non-transitory storage medium) such as an HDD or a flash memory of the automated driving control device 100, or may be stored in a detachable storage medium such as a DVD or a CD-ROM and installed in the HDD or the flash memory of the automated driving control device 100 by the storage medium (the non-transitory storage medium) being attached to a drive device.

Figure 2:
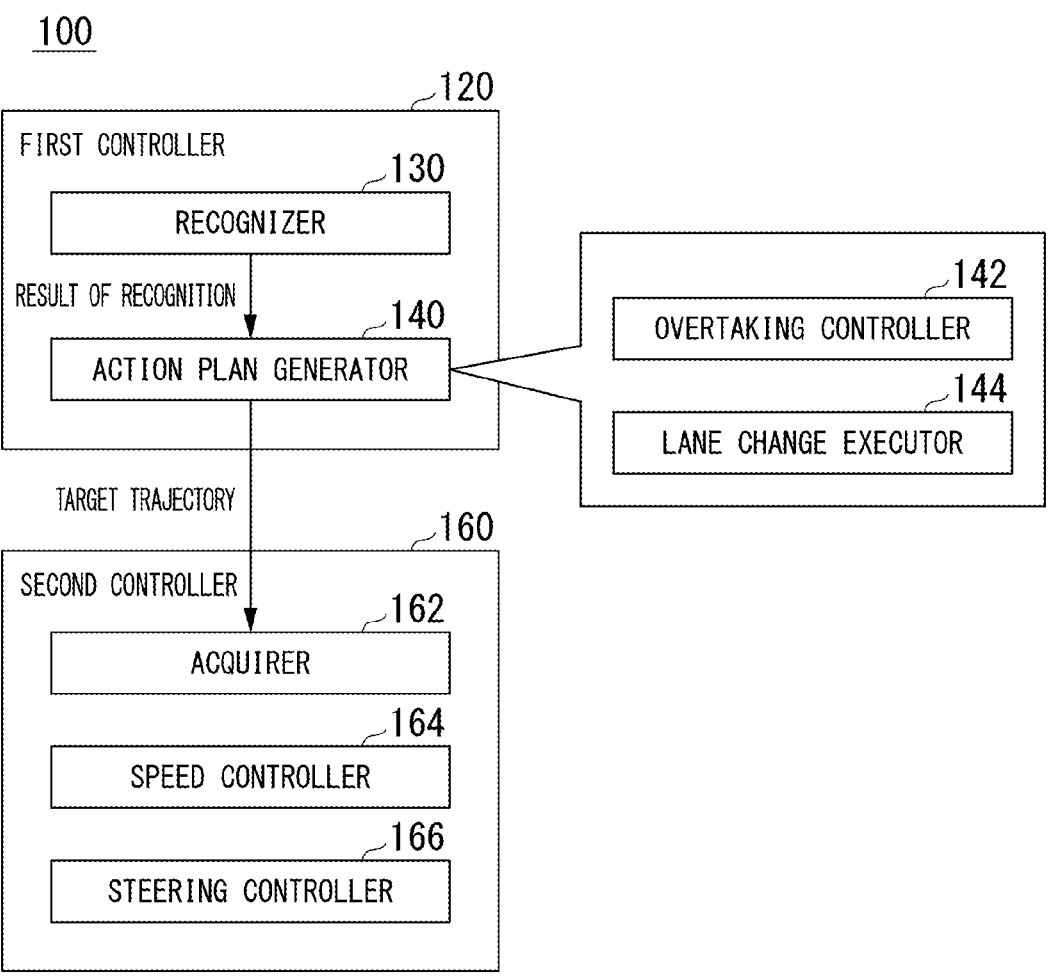
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 realizes, for example, a function based on artificial intelligence (AI) and a function based on a model given in advance in parallel. For example, a function of "recognizing an intersection" may be realized by executing a recognition of an intersection by deep learning or the like and a recognition based on conditions (including pattern matching signals, road markings, and the like) given in advance in parallel and comprehensively evaluating the both by scoring them. As a result, a reliability of automated driving is guaranteed.

The recognizer 130 recognizes objects present in the vicinity of the host vehicle on the basis of information to be input from the camera 10, the radar device 12, and the finder 14 via the object recognition device 16. The objects recognized by the recognizer 130 includes, for example, bicycles, motorcycles, four-wheeled vehicles, pedestrians, road signs installed on a side of a road, road markings formed on a road surface, marking lines, power poles, guardrails, falling objects, and the like. The recognizer 130 recognizes a state such as the position, speed, or acceleration of an object. The position of an object is, for example, recognized as a position (that is, a relative position with respect to the host vehicle) on relative coordinates having the origin at a representative point (a center of gravity, a center of a drive axis, or the like) of the host vehicle, and is used for control. The position of the object may be represented by a representative point such as a center of gravity or a corner of the object, or may be represented by an expressed area. The "state" of an object may include the acceleration or jerk of the object, or an "action state" (for example, whether a lane is being changed or is intended to be changed).

The recognizer 130 refers to the second map information 62 and recognizes that a road section in which the host vehicle is traveling is an automated driving permission section. For example, the recognizer 130 recognizes an automated driving permission section by comparing a pattern (for example, an array of solid lines and dashed lines) of a road section line obtained from the second map information 62 with a pattern of a road section line in the vicinity of the host vehicle recognized from an image captured by the camera 10. Furthermore, the recognizer 130 recognizes a host lane in which the host vehicle is traveling and an adjacent lane adjacent to the host lane on the basis of the comparison in pattern of the road section lines.

The recognizer 130 may recognize the automated driving permission section or recognize the host lane or the adjacent lane by recognizing not only a road section line but also a traveling road boundary (road boundary) including road section lines, road shoulders, curbs, median strips, guardrails, and the like. In this recognition, the position of the host vehicle acquired from the navigation device 50 and a result of processing executed by the INS may be added. The recognizer 130 recognizes temporary stop lines, obstacles, red lights, tollgates, or other road events.

When the host lane is recognized, the recognizer 130 recognizes a relative position and posture of the host vehicle with respect to the host lane. The recognizer 130 may recognize, for example, a deviation of a reference point of the host vehicle from a lane center and an angle of a traveling direction of the host vehicle formed with respect to a line connecting the lane center as the relative position and posture of the host vehicle with respect to the host lane. Instead, the recognizer 130 may recognize a position and the like of the reference point of the host vehicle with respect to either side end (a road section line or a road boundary) of the host lane as a relative position of the host vehicle with respect to the host lane.

The action plan generator 140 includes, for example, an overtaking controller 142 and a lane change executor 144.

The action plan generator 140 generates a future target trajectory in which the host vehicle travels in a recommended lane determined by the recommended lane determiner 61 in principle and the host vehicle is further caused to travel automatically (independently from an operation of a driver) in a travel mode defined in advance to cope with surroundings when the host vehicle travels on the recommended lane. The target trajectory includes, for example, a position element that defines the position of the host vehicle in the future and a speed element that defines the speed of the host vehicle in the future. The action plan generator 140 determines a target speed and target acceleration for each predetermined sampling time (for example, about a decimal number [sec]) as a speed element of the target trajectory. A trajectory point may also be a position to be reached by the host vehicle at a corresponding sampling time for each predetermined sampling time. In this case, the target speed and the target acceleration are determined by a sampling time and an interval between trajectory points. The action plan generator 140 outputs information indicating the generated target trajectory to the second controller 160. Each of the overtaking controller 142 and the lane change executor 144 has such a function. These will be described below.

The second controller 160 controls the traveling drive force output device 200, the brake device 210, and the steering device 220 such that the host vehicle passes through the target trajectory generated by the action plan generator 140 at a scheduled time.

The second controller 160 includes, for example, an acquirer 162, a speed controller 164, and a steering controller 166. A combination of the overtaking controller 142, the lane change executor 144, and the second controller 160 is an example of a "driving controller."

The acquirer 162 acquires information on the target trajectory (trajectory points) from the action plan generator 140, and stores it in a memory.

The speed controller 164 controls one or both of the traveling drive force output device 200 and the brake device 210 on the basis of a speed element (for example, a target speed, a target acceleration, or the like) included in the target trajectory stored in the memory.

The steering controller 166 controls the steering device 220 in accordance with a position element (for example, curvature or the like that indicates a degree of bending of the target trajectory) included in the target trajectory stored in the memory.

Processing executed by the speed controller 164 and the steering controller 166 is realized by, for example, a combination of feed forward control and feedback control. As an example, the steering controller 166 executes a combination of the feed forward control in accordance with curvature of a road in front of the host vehicle and the feedback control based on a deviation from the target trajectory.

The traveling drive force output device 200 outputs a traveling drive force (torque) for a traveling of a vehicle to drive wheels. The traveling drive force output device 200 includes, for example, a combination of an internal combustion engine, an electric motor, a transmission, and the like, and a power electronic control unit (ECU) that controls these. The power ECU controls the constituents described above according to information input from the second controller 160 or information input from the driving operator 80.

The brake device 210 includes, for example, a brake caliper, a cylinder that transmits a hydraulic pressure to the brake caliper, an electric motor that generates a hydraulic pressure to the cylinder, and a brake ECU. The brake ECU controls the electric motor according to the information input from the second controller 160 or the information input from the driving operator 80 such that a brake torque corresponding to a braking operation is output to each wheel. The brake device 210 may include, as a backup, a mechanism that transmits the hydraulic pressure generated by an operation of the brake pedal included in the driving operator 80 to the cylinder via a master cylinder. The brake device 210 is not limited to the configuration described above, and may be an electronically controlled hydraulic brake device that controls an actuator according to the information input from the second controller 160 and transmits the hydraulic pressure of the master cylinder to the cylinder.

The steering device 220 includes, for example, a steering ECU and an electric motor. The electric motor changes a direction of the steering wheel by, for example, applying a force to a rack and pinion mechanism. The steering ECU drives the electric motor and changes the direction of the steering wheel according to the information input from the second controller 160 or the information input from the driving operator 80.

[Overtaking Control]

The overtaking controller 142 performs overtaking control when conditions for overtaking are satisfied. The overtaking control means control for overtaking a preceding vehicle that travels on the same lane in the same direction as the host vehicle by moving from a first lane (a host traveling lane) to a second lane (an adjacent lane) adjacent to the first lane and then moving from the second lane to the first lane. In the overtaking control, an automatic lane change is performed from the first lane to the second lane, and then an automatic lane change is performed from the second lane to the first lane. The conditions for overtaking include, for example, a condition in which a relative speed between the preceding vehicle and the host vehicle is equal to or greater than a threshold value, or the like. The conditions for overtaking may include, for example, a condition related to a vicinity situation of the host vehicle in addition to the condition related to the relative speed between the preceding vehicle and the host vehicle. However, the overtaking controller 142 limits a start of the overtaking control when the host vehicle passes through the first area or the second area of a specific road structure even if the conditions for overtaking are satisfied. The specific road structure includes at least a tunnel or a bridge.

[Lane Change Control]

The lane change executor 144 performs lane change control when conditions for an automatic lane change are satisfied. The lane change control is control in which the host vehicle performs an automatic lane change from the first lane to the second lane adjacent to the first lane. The conditions for an automatic lane change include, for example, a condition in which a vehicle has reached a point where an automatic lane change is required on a driving route to a destination, a condition in which an occupant has operated a turn signal, or the like. The lane change executor 144 limits a start of the lane change control when the host vehicle passes through the first area or the second area of the specific road structure even if the conditions for an automatic lane change are satisfied. The lane change executor 144 may propose an automatic lane change to the occupant of the host vehicle through the HMI 30 when the conditions for an automatic lane change are satisfied, and may also start the lane change control when an operation by the occupant of the host vehicle is received through the HMI 30. Even if the start of the lane change control is limited, the lane change executor 144 may also cancel the limit on the lane change control when the operation by the occupant of the host vehicle is received through the HMI 30.

Figure 3:
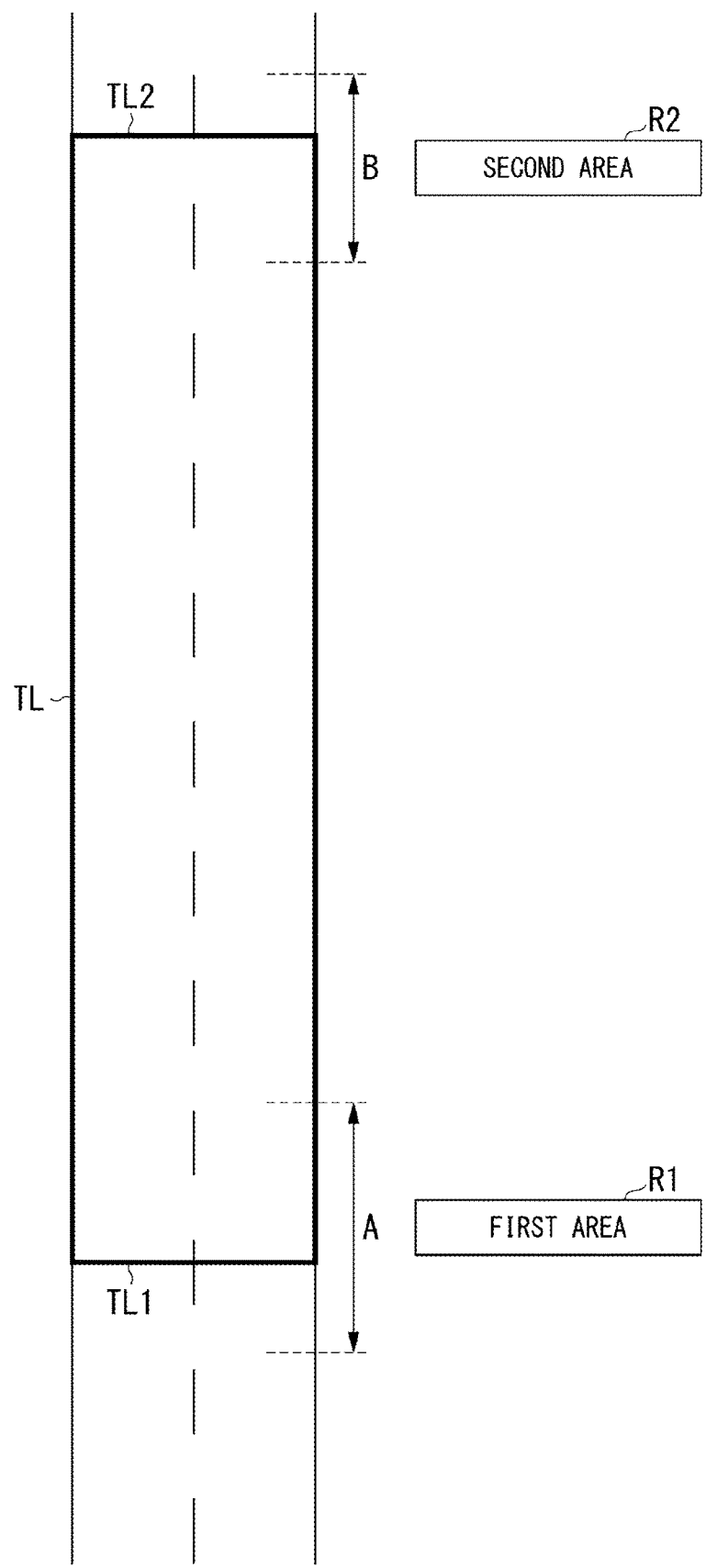
FIG. 3 is a diagram for describing an example of a first area and a second area of a specific road structure.

FIG. 3 is a diagram for describing an example of the first area or the second area of the specific road structure. In the following description, it is assumed that the specific road structure is a tunnel TL. In the shown example, a first area R1 and a second area R2 are set as a lane change prohibited areas in the tunnel TL. The first area R1 is an area having a length of a first distance A in a longitudinal direction of a road with an entrance TL1 (a starting point) of the tunnel TL set as a reference in the traveling direction of the host vehicle. In this example, the first area R1 is set from a side in front to a side to the rear of the entrance TL1 of the tunnel TL. However, the entrance TL1 of the tunnel TL may also be set as a starting point or a side slightly to the rear thereof may also be set as the starting point. The second area R2 is an area having a length of a second distance B in the longitudinal direction of the road with an exit TL2 (an end point) of the tunnel TL set as a reference in the traveling direction of the host vehicle. The second area R2 is set from a side in front to a side to the rear of the exit TL2 of the tunnel TL. However, the exit TL2 of the tunnel TL may be set as an end point or a side slightly to the rear thereof may also be set as the end point.

[Processing Flow of Vehicle Control Device]

Figure 4:
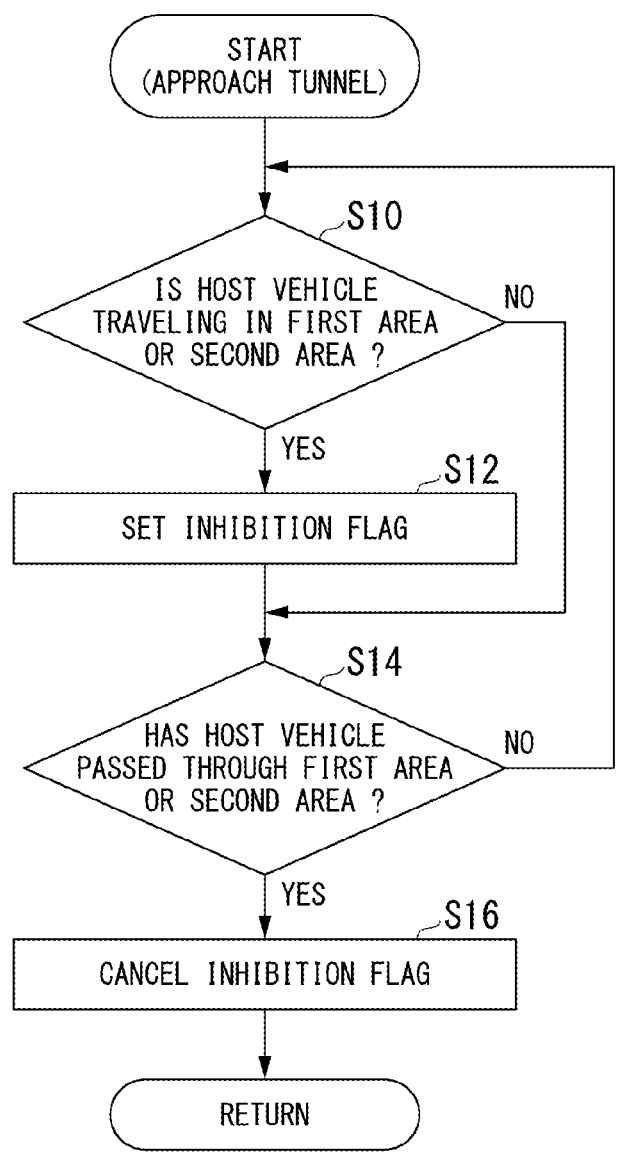
FIG. 4 is a flowchart which shows an example of a flow of a series of processing executed by an automated driving control device according to the first embodiment.
Figure 5:
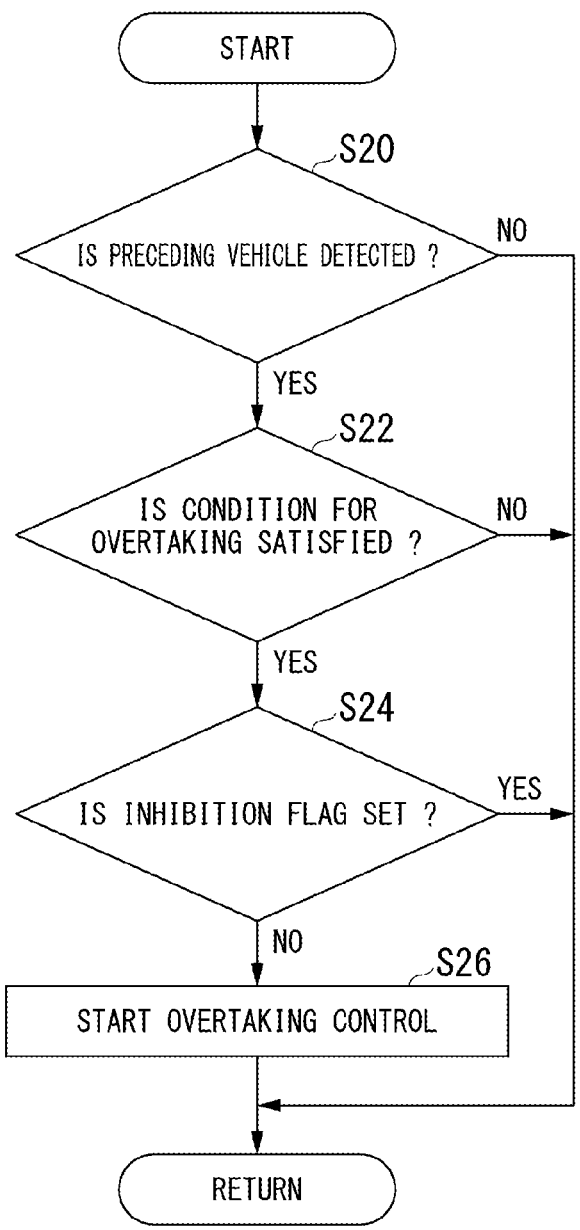
FIG. 5 is a flowchart which shows an example of the flow of a series of processing executed by the automated driving control device according to the first embodiment.

Hereinafter, a flow of a series of processing executed by the automated driving control device 100 according to the first embodiment will be described using a flowchart. FIGS. 4 and 5 are flowcharts which show examples of the flow of a series of processing executed by the automated driving control device 100 according to the first embodiment. FIG. 4 is a flowchart which shows an example of a flow of setting processing of an inhibition flag. FIG. 5 is a flowchart which shows an example of a flow of the overtaking control. The flowcharts shown in FIGS. 4 and 5 have processing advancing as independent processes.

First, the flowchart shown in FIG. 4 will be described. The processing in the flowchart shown in FIG. 4 may be executed, for example, when the host vehicle has approached the tunnel TL.

The overtaking controller 142 determines whether the host vehicle is traveling in the first area R1 or the second are R2 by referring to a result of recognition by the recognizer 130 that recognizes an external situation of the host vehicle or comparing the position of the host vehicle identified or supplemented on the basis of an output of the vehicle sensor 40 with the second map information 62 (step S10). Next, when the overtaking controller 142 determines that the host vehicle is traveling in the first area R1 or the second area R2, the overtaking controller 142 sets an inhibition flag (step S12). The inhibition flag is information for limiting a start of the overtaking control or the lane change control. When the inhibition flag is set, the overtaking control is not started even if the conditions for overtaking are satisfied. On the other hand, when the inhibition flag is cancelled, the overtaking control is started when the conditions for overtaking are satisfied.

Next, the overtaking controller 142 determines whether the host vehicle has passed through the first area R1 or the second area R2 in the latest control cycle (step S14). The overtaking controller 142 returns the processing to step S10 when it is determined that the host vehicle has not passed through the first area R1 or the second area R2 in the latest control cycle. The overtaking controller 142 repeats the processing of step S10 to step S14 until the host vehicle passes through the first area R1 or the second area R2 in the latest control cycle. The overtaking controller 142 cancels the setting of the inhibition flag when it is determined that the host vehicle has passed through the first area R1 or the second area R2 in the latest control cycle (step S16). As a result, processing of one cycle of this flowchart ends.

Next, the flowchart shown in FIG. 5 will be described. Processing in the flowchart shown in FIG. 5 is executed, for example, during automated driving.

First, the overtaking controller 142 determines whether a preceding vehicle is detected based on a result of recognition performed by the recognizer 130 (step S20). The overtaking controller 142 determines whether conditions for overtaking are satisfied when it is determined that the preceding vehicle is detected (step S22). The overtaking controller 142 determines whether the inhibition flag is set when it is determined that the conditions for overtaking are satisfied (step S24). The overtaking controller 142 starts the overtaking control when it is determined that the inhibition flag is not set (step S26). On the other hand, the overtaking controller 142 ends processing of one cycle of this flowchart instead of starting the overtaking control when it is determined that the inhibition flag is set.

In the flowchart shown in FIG. 5, when the inhibition flag is set, the land change control may be limited instead of (or in addition to) the overtaking control.

According to the automated driving control device 100 according to the first embodiment described above, it is possible to appropriately suppress control in a situation where the automatic lane change of the host vehicle is inappropriate. For example, immediately after the host vehicle has entered the tunnel TL or immediately before the host vehicle exits the tunnel TL, it is preferable to avoid execution of the automatic lane change of the host vehicle. Therefore, according to the automated driving control device 100 according to the first embodiment, when the first area R1 or the second area R2 is set as an area in which the automatic lane change of the host vehicle is inappropriate in the tunnel TL, and it is detected that the host vehicle is positioned in the first area R1 or the second area R2, the automatic lane change of the host vehicle is limited. As a result, it is possible to appropriately suppress the control in a situation where the automatic lane change of the host vehicle is inappropriate.

Second Embodiment

In the following description, a second embodiment will be described. As compared with the first embodiment, the second embodiment is different in processing content of the overtaking control in which it is determined whether the automatic lane change caused by overtaking is completed before the host vehicle reaches the first area or the second area, and the overtaking control is started based on a result of the determination. Hereinafter, this difference will be mainly described.

Figure 6:
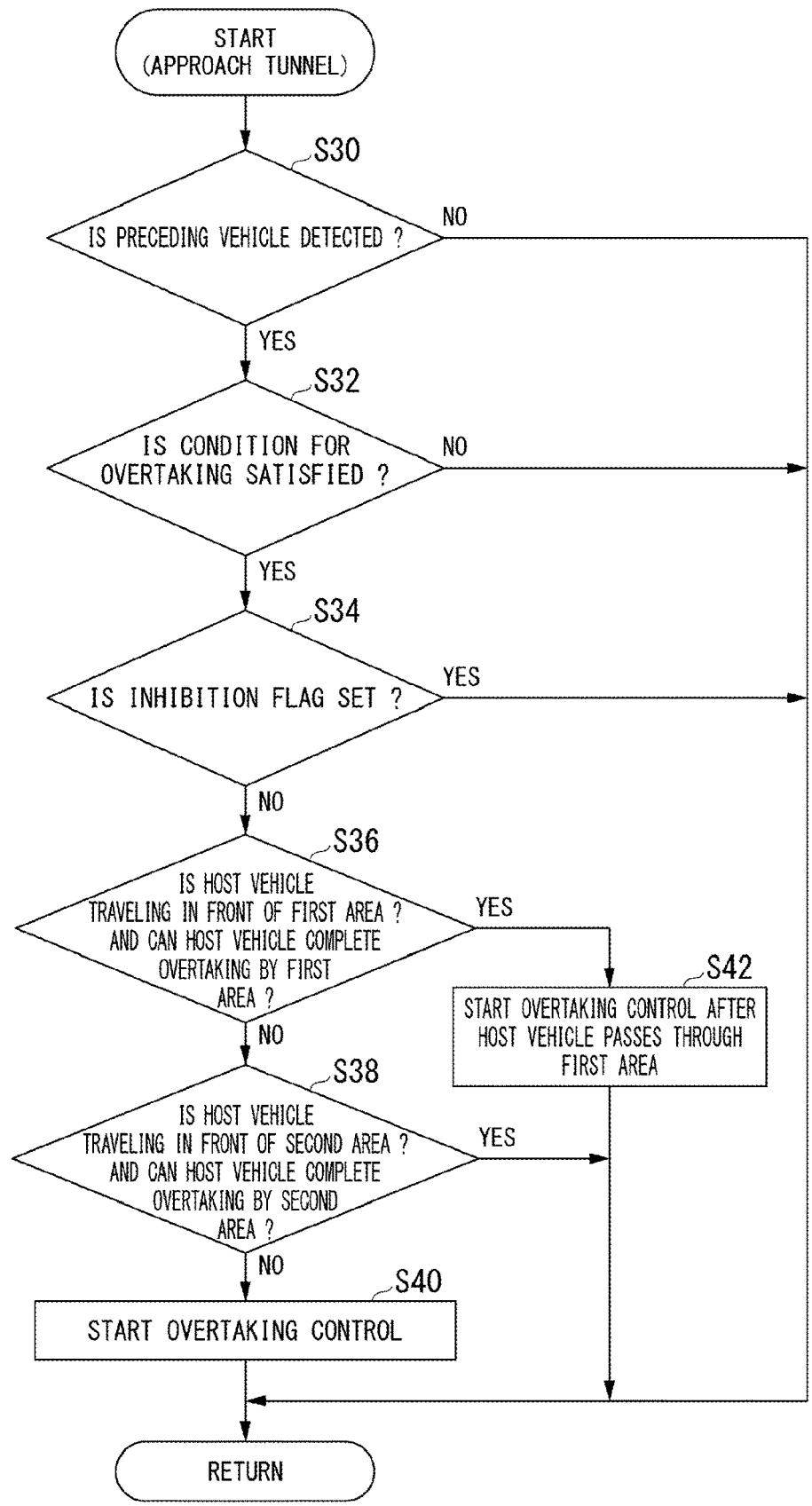
FIG. 6 is a flowchart which shows an example of a flow of a series of processing executed by an automated driving control device according to a second embodiment.

Hereinafter, the flow of a series of processing executed by the automated driving control device 100 according to the second embodiment will be described using a flowchart. FIG. 6 is a flowchart which shows an example of the flow of a series of processing executed by the automated driving control device 100 according to the second embodiment. FIG. 6 is a flowchart which shows an example of a flow of processing of the overtaking control.

The overtaking controller 142 according to the second embodiment determines whether a preceding vehicle is detected based on a result of recognition performed by the recognizer 130 (step S30). The overtaking controller 142 determines whether the conditions for overtaking are satisfied when it is determined that a preceding vehicle is detected (step S32). The overtaking controller 142 determines whether the inhibition flag is set when it is determined that the conditions for overtaking are satisfied (step S34).

When it is determined that the inhibition flag is not set, the overtaking controller 142 determines whether the host vehicle travels in front of the first area R1 and whether the host vehicle can complete overtaking by the first area R1 (step S36). In this case, the overtaking controller 142 first calculates a time required for the host vehicle to overtake the preceding vehicle based on a relative speed between the host vehicle and the preceding vehicle and a distance between the host vehicle and the preceding vehicle. The overtaking controller 142 calculates a traveling distance required for overtaking based on the calculated required time and a speed of the host vehicle. Then, the overtaking controller 142 determines whether the host vehicle can complete overtaking by the first area R1 by comparing the calculated traveling distance with a distance to the first area R1. The overtaking controller 142 may also determine that the host vehicle cannot complete the overtaking by the first area R1 without calculating the traveling distance required for the overtaking when another vehicle is present in an adjacent lane.

When it is determined that the host vehicle is not traveling in front of the first area R1 or that the host vehicle can complete the overtaking by the first area R1, the overtaking controller 142 determines whether the host vehicle travels in front of the second area R2 and whether the host vehicle can complete the overtaking by the second area R2 (step S38). The overtaking controller 142 starts overtaking control when it is determined that the host vehicle is not traveling in front of the second area R2 or that the host vehicle can complete the overtaking by the second area R2 (step S40). As a result, processing of one cycle of this flowchart ends. On the other hand, when the overtaking controller 142 determines that the host vehicle is traveling in front of the first area R1 and that the host vehicle cannot complete the overtaking by the first area R1 in a previous step S36, the overtaking control is started after the host vehicle passes through the first area R1 (step S42). As a result, the processing of one cycle of this flowchart ends. When the overtaking controller 142 determines that the host vehicle is traveling in front of the second area R2 and that the host vehicle cannot complete the overtaking by the second area R2 in a previous step S38, the processing of one cycle of this flowchart ends without starting the overtaking control.

According to the automated driving control device 100 according to the second embodiment described above, the overtaking control can be started more carefully, in addition to effects of the automated driving control device 100 according to the first embodiment. For example, when the overtaking control is started without determining whether the overtaking can be completed before the host vehicle reaches the first area R1 or the second area R2, if it is determined that the overtaking control cannot be completed after the overtaking control is started, it may be necessary to cancel the overtaking control. Therefore, according to the automated driving control device 100 according to the second embodiment, the overtaking control is started on a condition in which it is determined that the overtaking can be completed after determining whether the overtaking can be completed before the host vehicle reaches the first area R1 or the second area R2. As a result, the overtaking control can be started more carefully.

Third Embodiment

In the following description, a third embodiment will be described. The third embodiment, as compared to the first embodiment, is different in processing content of overtaking control in which the overtaking control is started and it is determined whether a vehicle can return to the first lane by the second area after moving to a second lane. Hereinafter, this difference will be mainly described.

Hereinafter, a flow of a series of processing executed by the automated driving control device 100 according to the third embodiment will be described using a flowchart. FIG.

Figure 7:
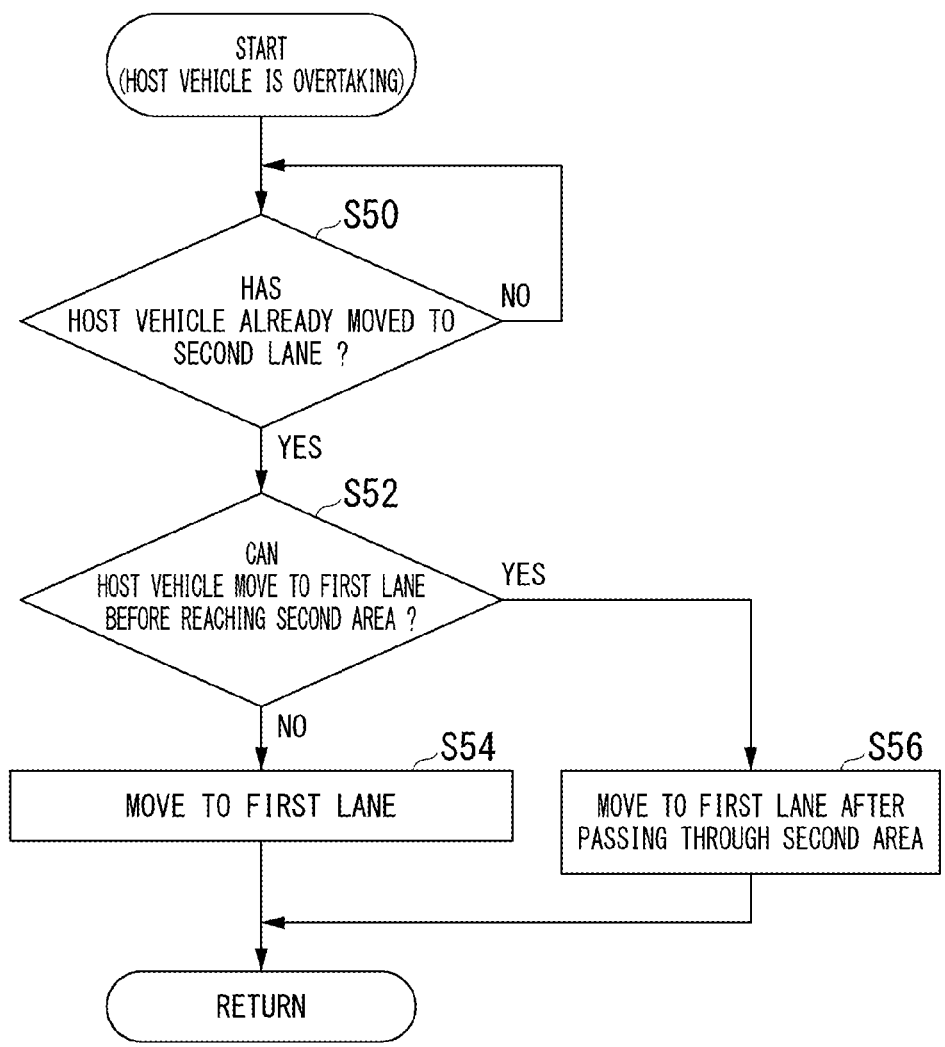
FIG. 7 is a flowchart which shows an example of a flow of a series of processing by an automated driving control device according to a third embodiment.

7 is a flowchart which shows an example of the flow of a series of processing executed by the automated driving control device 100 according to the third embodiment. FIG. 7 is a flowchart which shows an example of a flow of the processing after the overtaking control is started between the first area and the second area.

The flowchart shown in FIG. 7 will be described. The processing of the flowchart shown in FIG. 7 may also be executed, for example, when the overtaking control is started.

The overtaking controller 142 according to the third embodiment determines whether the host vehicle has already moved to the second lane (step S50). When it is determined that the host vehicle has already moved to the second lane, the overtaking controller 142 determines whether the host vehicle can move to the first lane before the reaching the second area R2 (step S52). When it is determined that the host vehicle can move to the first lane before reaching the second area R2, the overtaking controller 142 causes the host vehicle to move to the first lane (step S54). As a result, processing of one cycle of this flowchart ends. On the other hand, when it is determined that the host vehicle cannot move to the first lane before reaching the second area R2, the overtaking controller 142 causes the host vehicle to move to the first lane after passing through the second area R2 (step 56). As a result, the processing of one cycle of this flowchart ends.

According to the automated driving control device 100 according to the third embodiment described above, it is possible to control a completion timing of the overtaking control appropriately, in addition to the effects of the automated driving control device 100 according to the first embodiment. For example, although a lane change to the second lane may be performed after the overtaking control is started, since there is a case in which a vehicle which is a target of overtaking accelerates or the like, the host vehicle may not be able to return to the first lane by a predetermined area. Therefore, according to the automated driving control device 100 according to the third embodiment, after the overtaking control is started, it is determined whether the host vehicle can move to the first lane before reaching the second area R2 on the condition that the host vehicle has already moved to the second lane, and a timing at which the host vehicle moves to the first lane may be determined based on a result of the determination. As a result, it is possible to properly control the completion timing of the overtaking control.

MODIFIED EXAMPLES OF EMBODIMENT

First Modified Example

Figure 8:
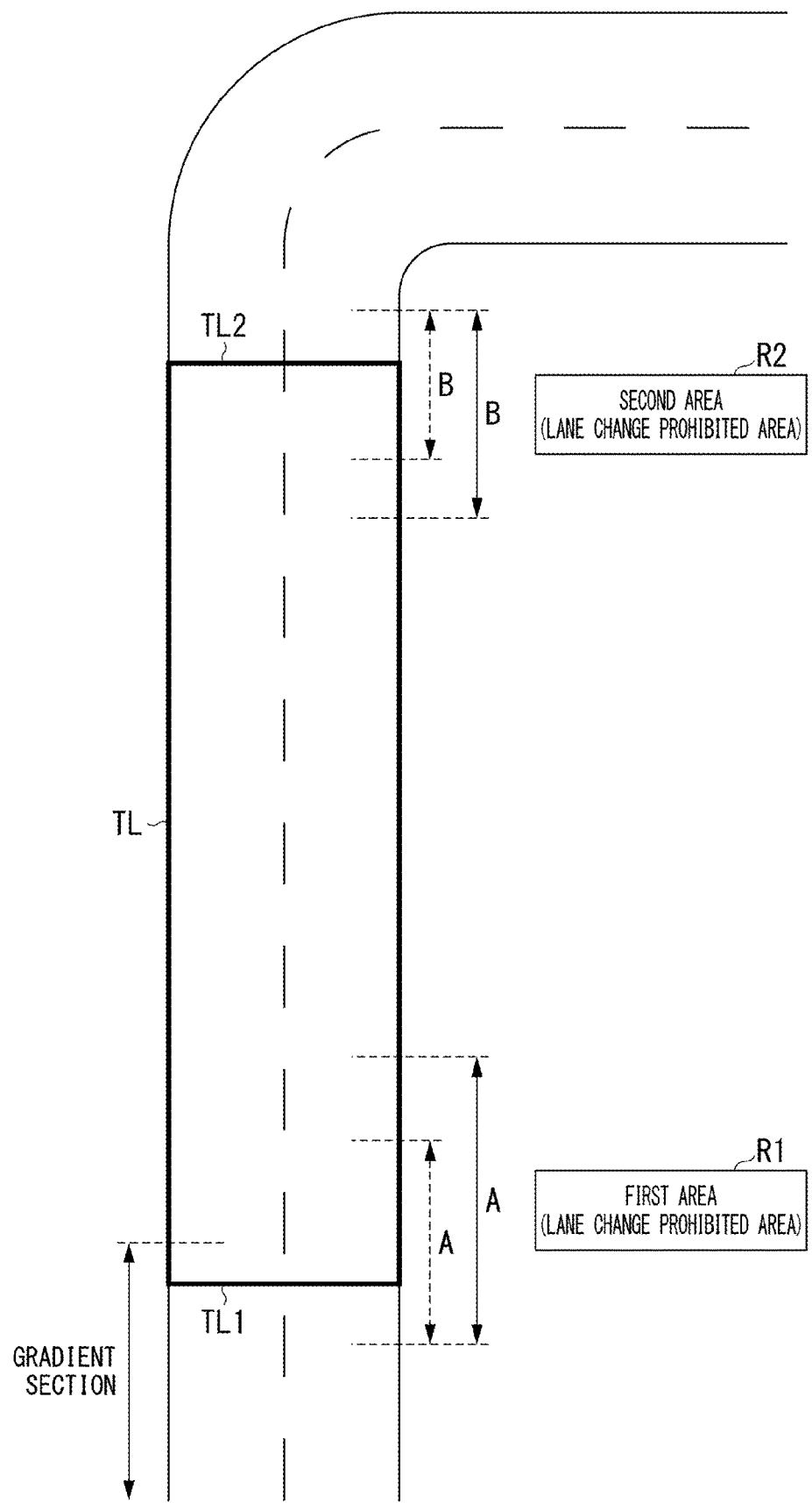
FIG. 8 is a diagram for describing an example of a setting method of a first area and a second area.
Figure 9:
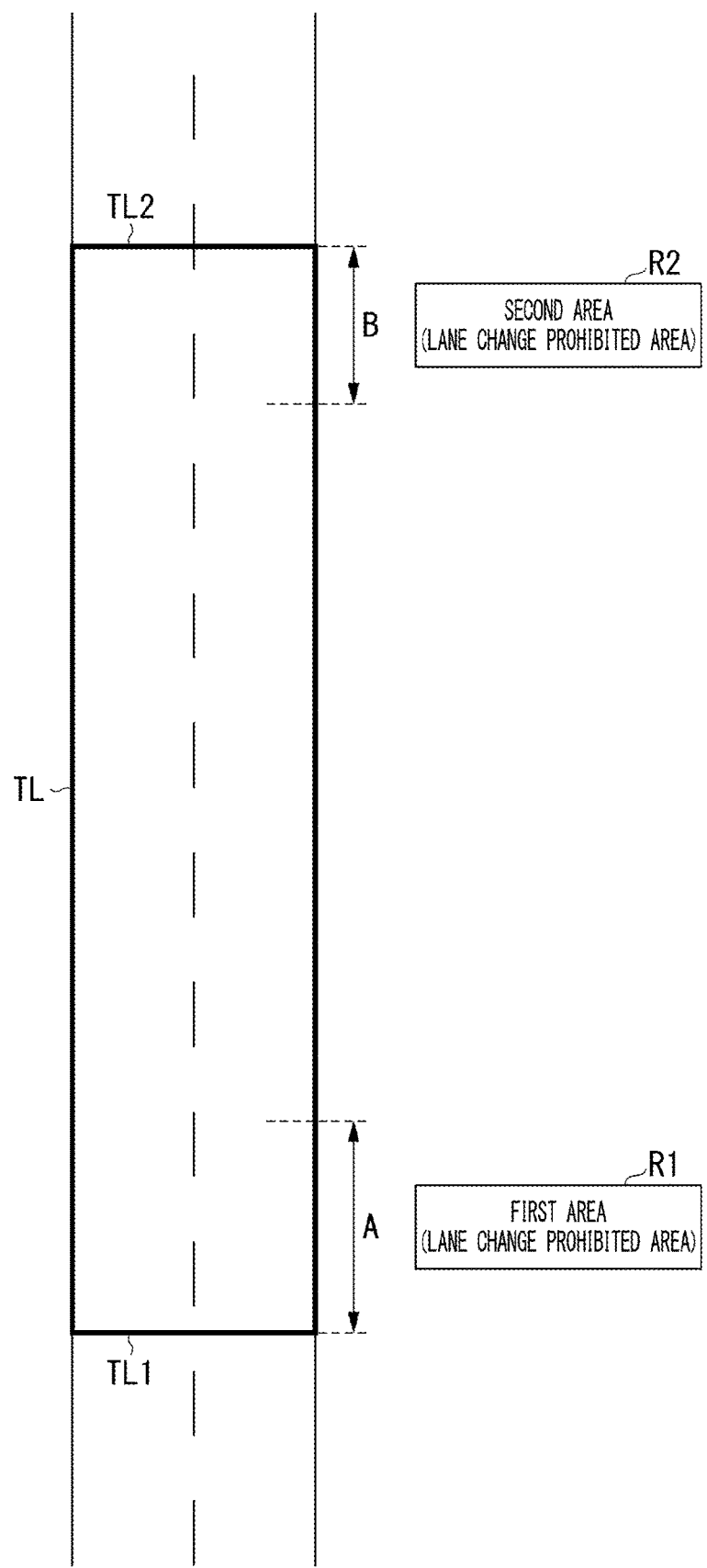
FIG. 9 is a diagram for describing an example of the setting method of the first area and the second area.
Figure 10:
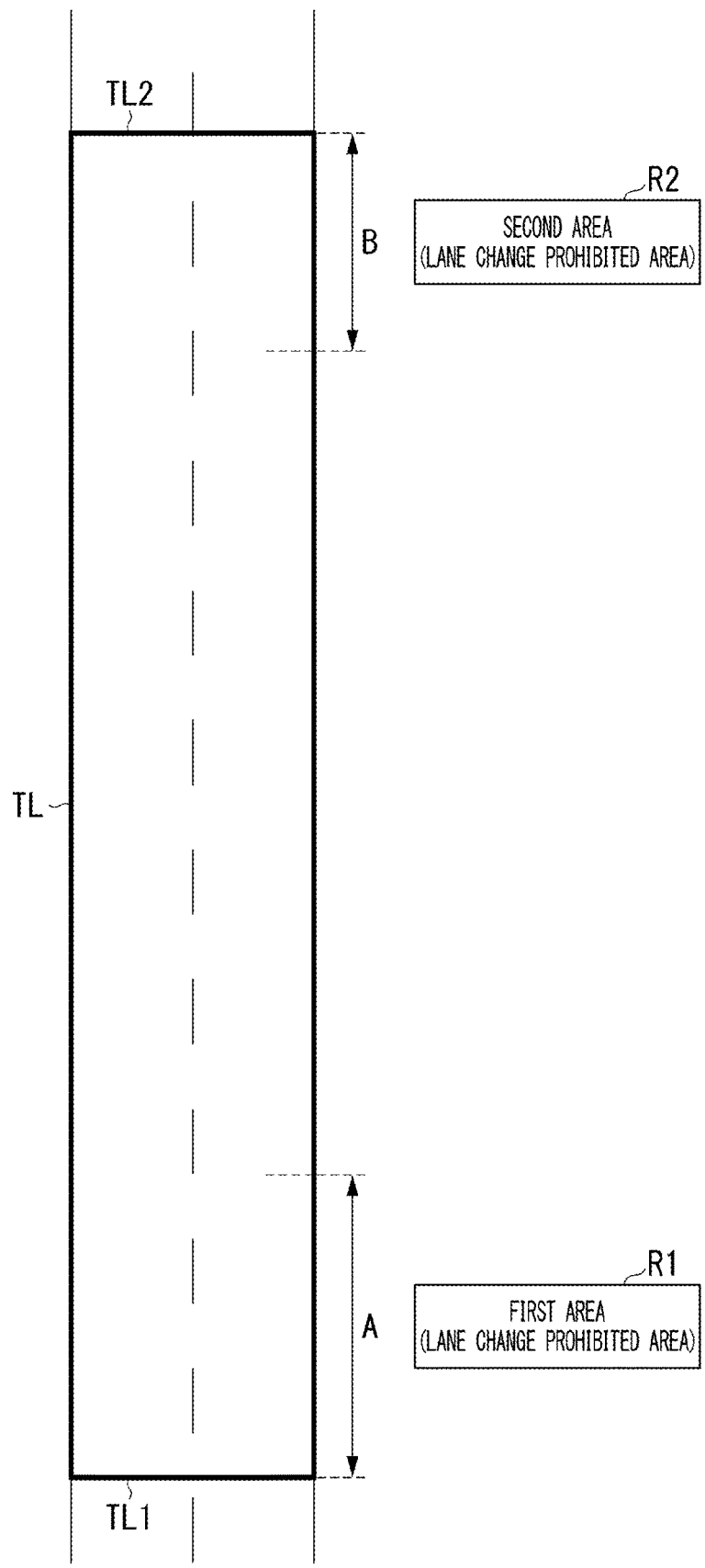
FIG. 10 is a diagram for describing an example of the setting method of the first area and the second area.

In each of the embodiments described above, the overtaking controller 142 may change the length of at least one of the first area R1 and the second area R2 in the longitudinal direction of a road on the basis of specific information indicating the traveling environment in the tunnel TL. The specific information includes information of at least a part of a length of the tunnel TL in the longitudinal direction of a road, an illuminance in the tunnel TL, and a gradient or curvature of the road. For example, as shown in FIG. 8, when a gradient section is included near the entrance TL1 or the exit TL2 of the tunnel TL, the length of the first area R1 or the second area R2 in the longitudinal direction of the road may be set to be longer than when the gradient section is not included. As in an example shown in FIGS. 9 and 10, the length of the first area R1 or the second area R2 in the longitudinal direction of the road may also be set to be longer as the length of the tunnel TL in the longitudinal direction of the road is longer. As an illuminance difference between the inside and outside of the tunnel TL is larger, the lengths of the first area R1 and the second area R2 in the longitudinal direction of the road may also be set to be longer.

Second Modified Example

Figure 11:
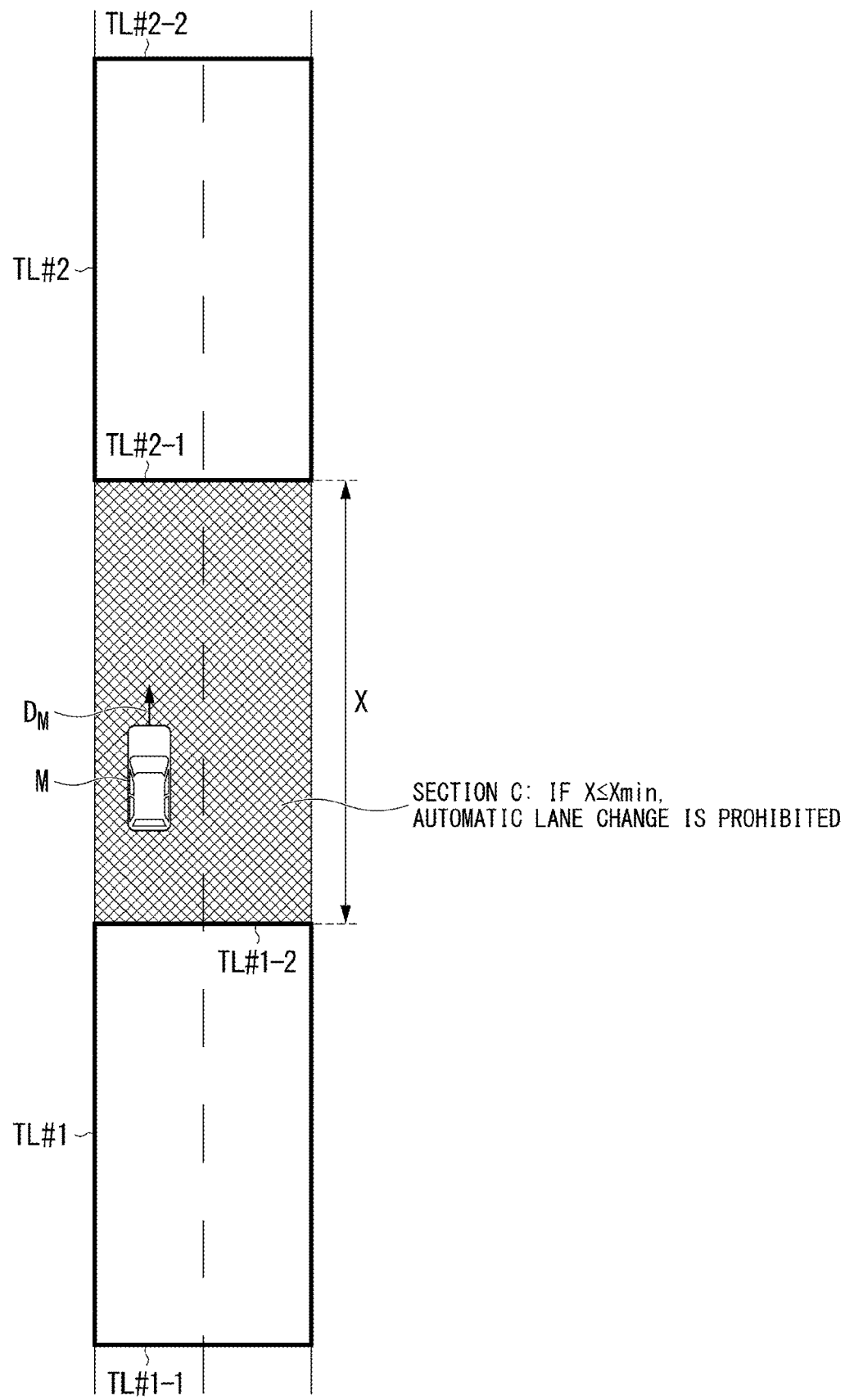
FIG. 11 is a diagram for describing processing of a second modified example.

When a distance X from an exit (an end point) TL #1-2 of a certain tunnel TL (hereinafter, a first tunnel TL #1) to an entrance (a starting point) TL #2-1 of a tunnel TL (hereinafter, a second tunnel TL #2) through which the host vehicle passes next after the first tunnel TL #1 is equal to or less than a predetermined distance Xmin, the action plan generator 140 may limit the automatic lane change in a section C between the exit TL #1-2 of the first tunnel TL #1 and the entrance TL #2-1 of the second tunnel TL #2. FIG. 11 is a diagram for describing processing of a second modified example. In FIG. 11, M represents the host vehicle and $D_M$ represents the traveling direction of the host vehicle. The section C is a section in which the automatic lane change is prohibited if the distance X is equal to or less than the predetermined distance Xmin. In order to realize related processing, for example, the determination processing of step S10 in FIG. 4 may be changed to "determining whether the host vehicle is traveling in the first area R1 or the second area R2, or whether the host vehicle is traveling in the section C in which the distance X is equal to or less than the predetermined distance Xmin" As a result, when the host vehicle is traveling in the section C in which the distance X is equal to or less than the predetermined distance Xmin, the inhibition flag is set and the automatic lane change is prohibited.

Third Modified Example

Figure 12:
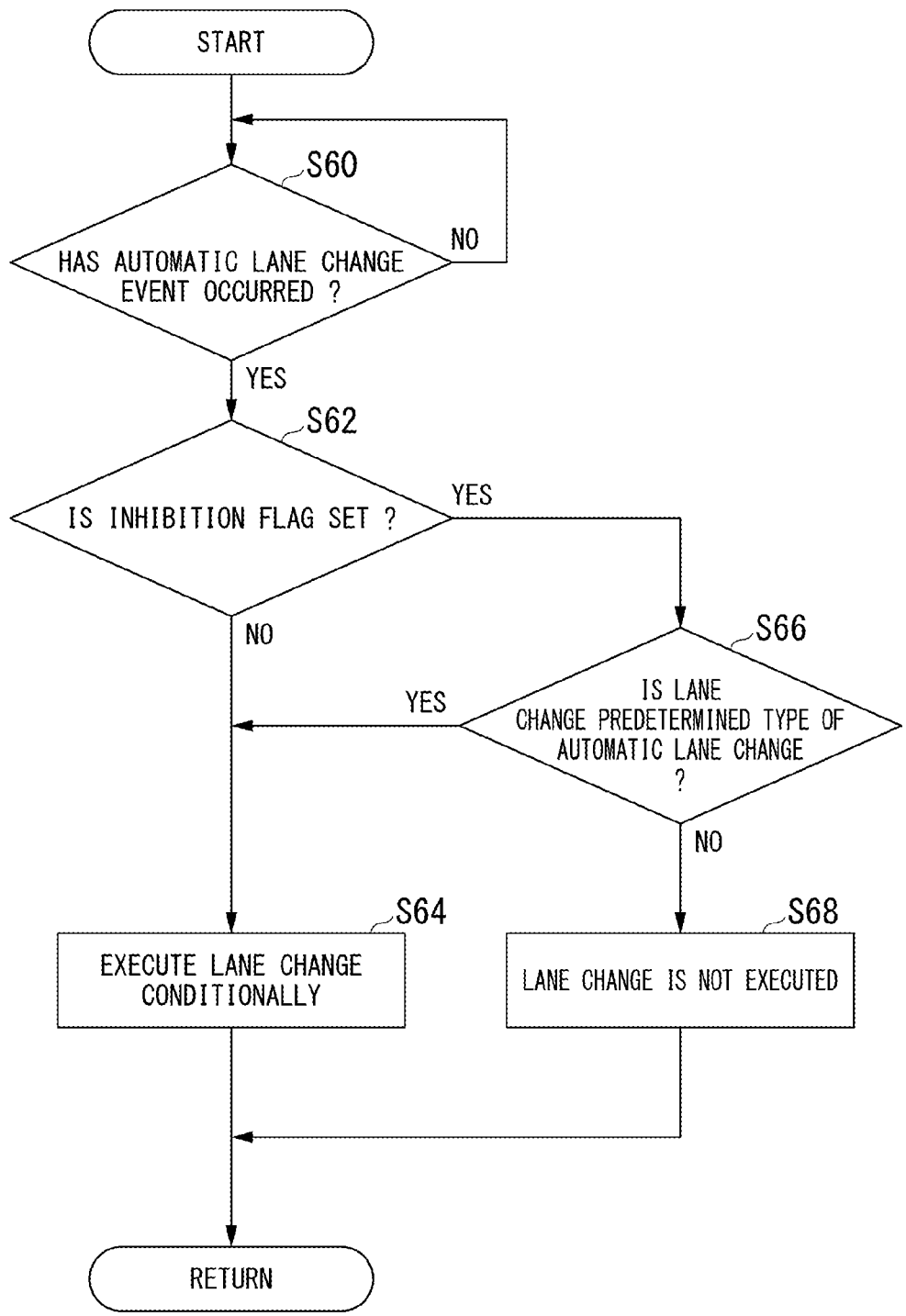
FIG. 12 is a flowchart which shows an example of a flow of processing of a third modified example.

When the inhibition flag is set by the host vehicle being in the first area or the second area (or an area between tunnels within the predetermined distance described above), the action plan generator 140 may execute a predetermined type of automatic lane change and may not execute an automatic lane change other than the predetermined type as another example of limiting the automatic lane change. FIG. 12 is a flowchart which shows an example of a flow of processing of a third modified example. As a premise of this flowchart, it is assumed that the inhibition flag is set by the processing described in FIG. 4 and the like.

First, the action plan generator 140 determines whether an automatic lane change event has occurred (step S60). A trigger for causing the automatic lane change event to occur will be described in S66. When the automatic lane change event has occurred, the action plan generator 140 determines whether the inhibition flag is set (step S62). When the inhibition flag is not set, the action plan generator 140 executes the automatic lane change (step S64).

When the inhibition flag is set, the action plan generator 140 determines whether an automatic lane change related to an automatic lane change event is the predetermined type of automatic lane change (step S66). The action plan generator 140 executes an automatic lane change conditionally when the automatic lane change related to the automatic lane change event is the predetermined type of automatic lane change (step S64), and does not execute an automatic lane change when it is not the predetermined type of automatic lane change (step S68).

The following types of automatic lane changes exist in the third modified example.

Type 1: an automatic lane change according to a system request (Part 1)

Type 2: an automatic lane change according to a system request (Part 2)

Type 3: an automatic lane change according to a driver request (Part 3)

Type 1 is an automatic lane change that the action plan generator 140 voluntarily performs for any reason, for example, that the conditions for overtaking a preceding vehicle are satisfied or that a lane change is required to reach the destination. The action plan generator 140 treats Type 1 as not being the predetermined type. That is, when an automatic lane change event of Type 1 has occurred, the action plan generator 140 does not execute the automatic lane change.

Type 2 is an automatic lane change that the action plan generator 140 voluntarily performs, and an automatic lane change to be performed via an approval of a driver by making an inquiry to the driver. Inquiries and approvals are made using the HMI 30. The action plan generator 140 treats Type 2 as not being the predetermined type. That is, when an automatic lane change event of Type 2 has occurred, the action plan generator 140 does not execute the automatic lane change.

Type 3 is an automatic lane change based on an operation performed by the driver. The action plan generator 140 determines that an instruction for an automatic lane change has been given and performs the automatic lane change when a turn signal lever included in the driving operator 80 is operated with a first operation amount. This is an automatic lane change of Type 3. When the automatic lane change of Type 3 has occurred, the action plan generator 140 determines that an automatic lane change of the predetermined type has been instructed, and executes, for example, the automatic lane change conditionally. For example, the action plan generator 140 outputs information indicating that a lane change cannot be performed using the HMI 30 during a first operation, and executes the automatic lane change by assuming that the conditions are satisfied when a second operation is performed. The action plan generator 140 may execute the automatic lane change without imposing a related condition.

Note that the action plan generator 140 does not prohibit (permits execution) a lane change according to manual driving of the driver after switching to manual driving on the basis of an operation performed by the driver. The automated driving control device 100 stops automated driving and switches to manual driving when the driver has operated the turn signal lever included in the driving operator 80 with a second operation amount. The second operation amount is an operation amount that is larger than the first operation amount, and is, for example, an operation amount when the turn signal lever is operated with a maximum operation. In this case, a lane change is performed by a steering operation of the driver. Switching to the manual driving is performed similarly on the basis of an operation to another driving operator 80 in addition to the turn signal lever.

Alternatively, when the driver has operated the turn signal lever with the second operation amount, the action plan generator 140 may perform the automatic lane change without imposing a condition as in the case where the turn signal lever is operated with the first operation amount. The automatic lane change in this case is treated as the predetermined type of automatic lane change.

The present invention can also be applied to a vehicle that does not have an automated driving function and has an automatic lane change function. The automatic lane change function in this case means, for example, a function that controls both the speed and steering of a vehicle to execute a lane change when the occupant has given an instruction for lane change control by operating a turn signal during an operation of adaptive cruise control (ACC) or lane keep assist system (LKAS), or the like. In addition, in the case of a vehicle having an automated driving function, and having the automatic lane change function described above at the time of manual driving, the present invention may be applied to both automatic lane changes at the time of automated driving and manual driving.

As described above, although the modes for implementing the present invention have been described above using the embodiments, the present invention is not limited to these embodiments, and various modifications and substitutions are made within a range not departing from the gist of the present invention.

The embodiments described above can be expressed as follows.

A vehicle control device includes a storage device that stores a program, and a hardware processor, wherein the hardware processor executes the program, controls a speed and steering of a vehicle to perform an automatic lane change, and limits the automatic lane change when it is detected that the vehicle is in a first area having a length of a first distance in a longitudinal direction of a road with a starting point of a specific road structure set as a reference or in a second area having a length of a second distance in the longitudinal direction of the road with an end point of the specific road structure set as a reference on the basis of information of at least one of an external recognition result and map information.

What is claimed is:

1. A vehicle control device comprising:
a driving controller configured to control a speed and steering of a vehicle to perform an automatic lane change,
wherein the driving controller limits the automatic lane change when it is detected that the vehicle is in a first area having a length of a first distance in a longitudinal direction of a road with a starting point of a specific road structure set as a reference or in a second area having a length of a second distance in the longitudinal direction of the road with an end point of the specific road structure set as a reference on the basis of information of at least one of an external recognition result and map information,
wherein the driving controller performs the automatic lane change from a host traveling lane to an adjacent lane when overtaking of a preceding vehicle that travels on the same lane as the vehicle is performed, and then the automatic lane change is performed from the adjacent lane to the host traveling lane, and
wherein the driving controller permits the automatic lane change when it is determined that the automatic lane change from the adjacent lane related to the overtaking to the host traveling lane can be completed before the vehicle reaches the second area after the vehicle passes through the first area.

2. The vehicle control device according to claim 1,
wherein the driving controller permits the automatic lane change before the vehicle reaches the second area after the vehicle passes through the first area, and performs the automatic lane change from the adjacent lane to the host traveling lane after the vehicle passes through the second area instead of performing the automatic lane change from the adjacent lane to the host traveling lane before the vehicle passes through the second area when it is determined that the automatic lane change from the adjacent lane to the host traveling lane cannot be completed due to a situation change after an automatic lane change from the host traveling lane to the adjacent lane is performed.

3. The vehicle control device according to claim 1,
wherein the driving controller performs the overtaking when it is determined that the automatic lane change from the adjacent lane related to the overtaking to the host traveling lane can be completed before the vehicle reaches the first area.

4. The vehicle control device according to claim 3,
wherein the driving controller performs the automatic lane change from the host traveling lane to the adjacent lane after the vehicle passes through the first area instead of performing the automatic lane change from the host traveling lane to the adjacent lane before the vehicle passes through the first area when it is determined that the automatic lane change from the adjacent lane related to the overtaking to the host traveling lane cannot be completed before the vehicle reaches the first area.

5. The vehicle control device according to claim 3,
wherein the driving controller determines whether to perform the overtaking again after the vehicle passes through the first area when it is determined that the automatic lane change from the adjacent lane related to the overtaking to the host traveling lane cannot be completed before the vehicle reaches the first area.

6. The vehicle control device according to claim 1,
wherein, when it is detected that the vehicle is in the first area or the second area, the driving controller executes a predetermined type of automatic lane change and does not execute an automatic lane change other than the predetermined type.

7. The vehicle control device according to claim 1,
wherein the road structure includes at least a tunnel or a bridge.

8. The vehicle control device according to claim 1,
wherein the driving controller changes a length of at least one of the first area and the second area in the longitudinal direction of a road on the basis of specific information indicating a traveling environment in the specific road structure.

9. The vehicle control device according to claim 8,
wherein the specific information includes information of at least a part of a length of the specific road structure in the longitudinal direction of the road, an illuminance in the specific road structure, and a gradient or curvature of the road.

10. A vehicle control device comprising:
a driving controller configured to control a speed and steering of a vehicle to perform an automatic lane change,
wherein, when it is detected that a distance from an end point of a first specific road structure to a starting point of a second specific road structure through which the vehicle passes next to the first specific road structure is equal to or less than a predetermined distance on the basis of information of at least one of an external recognition result and map information, the driving controller limits the automatic lane change in a section from the end point of the first specific road structure to the starting point of the second specific road structure.

11. A vehicle control method using a computer comprising:
controlling a speed and steering of a vehicle to perform an automatic lane change; and
limiting the automatic lane change in a section from an end point of a first specific road structure to a starting point of a second specific road structure through which the vehicle passes next to the first specific road structure, when it is detected that a distance from the end point of the first specific road structure to the starting point of the second specific road structure is equal to or less than a predetermined distance on the basis of information of at least one of an external recognition result and map information.

12. A computer-readable non-transitory storage medium that stores a program causing a computer to execute:
processing of controlling a speed and steering of a vehicle to perform an automatic lane change; and
processing of limiting the automatic lane change in a section from an end point of a first specific road structure to a starting point of a second specific road structure through which the vehicle passes next to the first specific road structure, when it is detected that a distance from the end point of the first specific road structure to the starting point of the second specific road structure is equal to or less than a predetermined distance on the basis of information of at least one of an external recognition result and map information.

* * * * *